United States Patent [19]

Vuichard

[11] Patent Number: 4,870,412
[45] Date of Patent: Sep. 26, 1989

[54] WARNING DEVICE ON AN AIRCRAFT
[75] Inventor: Claude Vuichard, Fribourg, Switzerland
[73] Assignee: Air-Zermatt AG., Zermatt, Switzerland
[21] Appl. No.: 86,639
[22] Filed: Aug. 18, 1987
[30] Foreign Application Priority Data
   Sep. 10, 1986 [CH] Switzerland .......................... 3632/86
[51] Int. Cl.$^4$ ............................................ G08B 21/00
[52] U.S. Cl. .................................. 340/946; 73/178 H; 244/17.13; 340/963; 364/434; 416/42; 416/61
[58] Field of Search ............... 340/945, 946, 963, 967; 73/178 H, 178 T; 364/434, 435, 424; 244/17.13; 416/31, 42, 61

[56] References Cited
U.S. PATENT DOCUMENTS

| | | | |
|---|---|---|---|
| 2,806,402 | 9/1957 | Ferris ...................................... | 416/61 |
| 3,537,323 | 11/1970 | LeClair et al. ..................... | 73/178 H |
| 3,616,691 | 11/1971 | Brandau ............................. | 73/178 H |
| 3,744,928 | 7/1973 | Hansen et al. ......................... | 416/61 |
| 3,754,440 | 8/1973 | Edgerton et al. ................. | 73/178 H |
| 3,925,751 | 12/1975 | Bateman et al. ..................... | 340/967 |
| 4,115,755 | 9/1978 | Cotton ............................. | 244/17.13 |
| 4,263,804 | 4/1981 | Seemann ........................... | 73/178 H |
| 4,488,236 | 12/1984 | Morrison et al. .................... | 364/442 |
| 4,763,285 | 8/1988 | Moore et al. ......................... | 340/963 |

Primary Examiner—Joseph A. Orsino
Assistant Examiner—Brent A. Swarthout
Attorney, Agent, or Firm—Brady, O'Boyle & Gates

[57] ABSTRACT

A measuring device (1, 12, 13, 14) is equipped with a blade angle indicator (1) indicating the blade angle adjustment of the rotor blades of a helicopter, a pressure altimeter (13) and an outside temperature probe (14). The measuring device (1, 12, 13, 14) is linked to a control device (4-6) which has a central processing unit (4) and a program memory (5). The memory (5) stores data processing instructions for determining density height from pressure height and outside temperature as well as data processing instructions corresponding to the helicopter operating instructions for determining the permissible maximum value of the blade angle from the density height. The control device (4-6) periodically determines the density height on the basis of the prevailing pressure height and outside temperature and the corresponding permissible maximum value of the blade angle. It compares the blade angle value of the blade angle indicator (1) with the maximum value and when the value exceeds the maximum value controls an audible signal generator (21) linked to the transceiver (20) of the helicopter which emits an audible signal to the headphones (23) of the transceiver for as long as the value is exceeded.

8 Claims, 1 Drawing Sheet

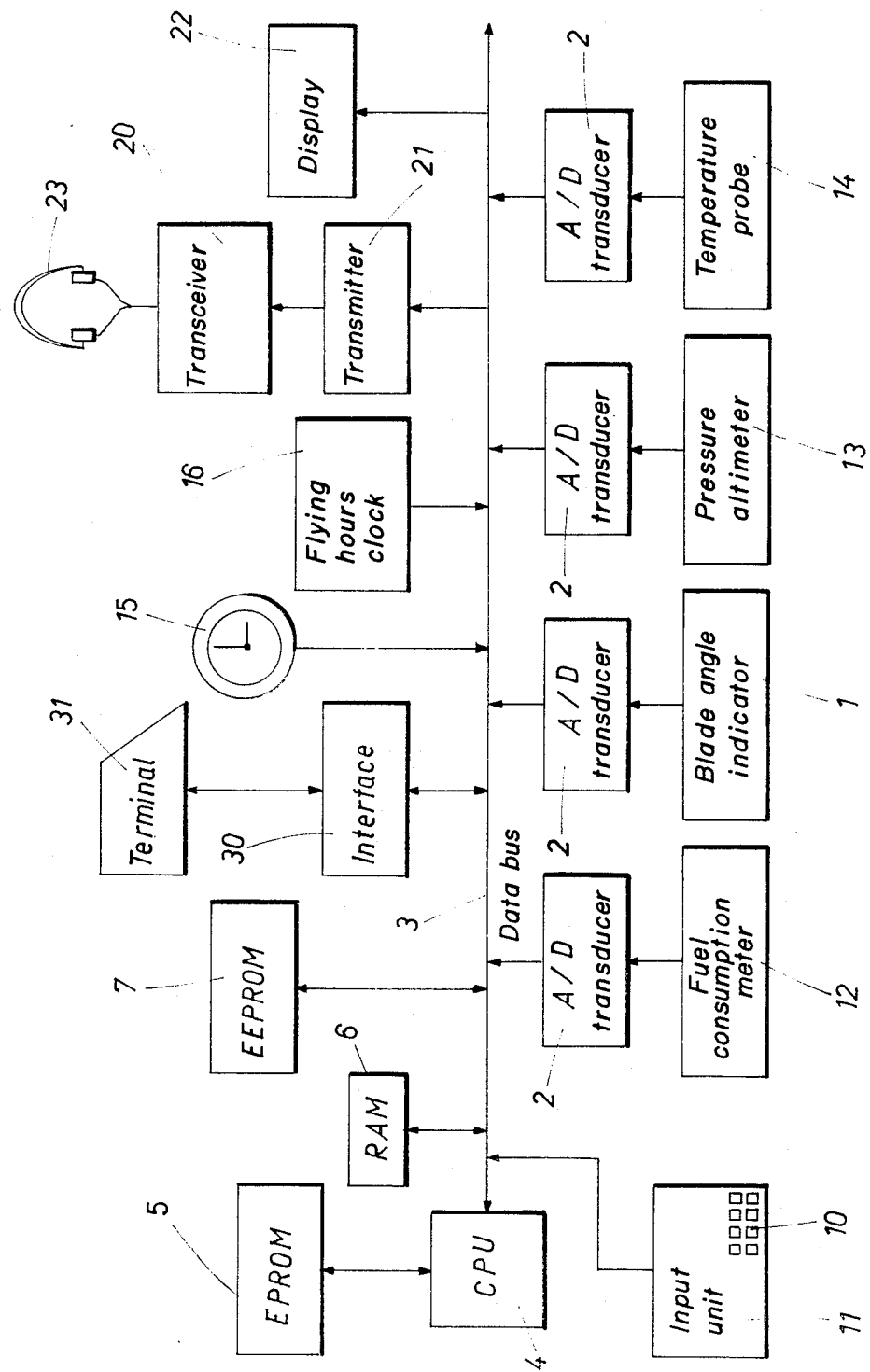

4,870,412

WARNING DEVICE ON AN AIRCRAFT

BACKGROUND OF THE INVENTION

The invention relates to a warning device on an aircraft and a warning device on a rotary wing aircraft.

It is the object of the invention to provide a device which warns the pilot of overloading of the engine or of the latter's gear unit.

SUMMARY OF THE INVENTION

The device according to the invention measures the torque or output of the aeroengine (or of at least one of the aeroengines) by means of the measuring device and transmits an audible signal to the pilot's headphones via an audible signal generator controlled by the control device when the measured value exceeds a maximum value, i.e. when the engine or its gear unit is overloaded. The device according to another form of the invention does not measure torque or output directly, but determines by means of the measuring device and the control device provided with a central processing unit and a program memory the parameters indirectly governing the load on the engine or gear unit of the rotary wing aircraft, in other words the density height and the blade angle of the rotor blades and triggers the audible signal generator when the blade angle value exceeds a maximum value for the blade angle determined according to the relevant density height when the engine or its gear unit is overloaded.

By means of an audible signal produced by the device of the invention which is clearly heard over the headphones, even when the noise level is high, the pilot is immediately warned of overloading of the gear unit or of the engine. This warning is particularly important in the case of helicopters, the flight engine output of which is considerably greater than the permissible loading of the gear unit and in which the fitting of a torque indicator is impossible for structural reasons, with the result that the pilot has hitherto been unable to immediately detect overloading of the gear unit, but had to determine density height on the basis of pressure altitude and temperature according to diagrams contained in the helicopter operating instructions and, on the basis thereof, the maximum permissible blade angle. Hitherto the danger of damage to the engine or gear unit due to disregard of these instructions has been great. In order to prevent the pilot's disregarding the warning signal, the data indicating the overloading can be stored in a control memory, the contents of which can be read by a portable connecting unit not accessible to the pilot which can be connected to the control device or to the control memory and only be deleted by means of said connecting unit.

Embodiments of the invention are described in more detail below with reference to the drawing.

BRIEF DESCRIPTION OF THE DRAWING

The single drawing shows a block diagram of a warning device installed in a helicopter.

DESCRIPTION OF THE PREFERRED EMBODIMENTS

The helicopter is equipped with a blade angle adjusting device (not shown) for adjusting the blade angle of the rotor blades which has an adjusting handle linked to the rotor blades by means of a gear. Disposed at the gear unit is a blade angle indicator 1 designed as a so-called "synchro-resolver-transformer" (revolution recorder) which is connected via the analog/digital transducer 2 to the data bus 3 of the central processing unit (CPU) 4 of a microprocessor. The microprocessor and the battery supplying it are disposed in a sealed housing so that the device cannot be switched off. The central processing unit 4 is linked to a program memory (EPROM) 5, a writing/reading working memory (RAM) 6 and a control memory (EEPROM) 7 serving to store overload data. Apart from the blade angle indicator 1 the following additional input units are connected to the data bus 3 of the central processing unit 4: an input unit 11 provided with a keyboard 10 for entering data, in particular persons' weights and the amount of fuel taken on board, a fuel consumption meter 12, a pressure altimeter (barometric height indicator) 13, a temperature probe 14 for measuring the outside temperature, mounted on the outside of the helicopter, a clock 15 and a switch 16 for determining flying time which is so disposed between the landing gear and the cell (chassis) of the helicopter that it closes when the latter lands and opens when the latter takes off. Those input units delivering an analog signal are connected to the data bus 3 by means of an analog/digital transducer 2. Output units connected to the data bus 3 of the central processing unit 4 are a sound transmitter 21 linked to the transceiver unit (intercom) 20 of the aircraft and a display 22, whereby the headphones of the unit 20 are designated as 23. Provision is also made for an interface 30 to which may be connected a portable input/output terminal 31 which serves to read and delete the contents of the EEPROM control memory 7.

Stored in the program memory 5 are data processing instructions for determining density height from pressure height and temperature, permissible maximum value of the blade angle from density height, weight at a given time from take-off weight and weight of fuel used, maximum permissible flight speed from density height and weight at a given time, and maximum load. These data processing and program control instructions are explained below in connection with the mode of operation of the device.

Before take-off, the pilot enters the weight of persons flying and the amount of fuel in the tank using the keyboard 10. (The amount of fuel could also be entered automatically by a filling level indicator connected to the data bus 3). The central processing unit 4 calculates the take-off weight $W_{take-off}$ herefrom and from the actual weight of the helicopter stored in the program memory 5.

When the helicopter takes off, the switch 16 is automatically opened and the central processing unit 4 stores in the control memory 7 a code number designating the take-off of the helicopter with the date and the take-off time $T_{take-off}$ shown on the clock 15.

During flight the central processing unit 4 periodically, at 2-hourly intervals, calculates density height $H_{density}$ from the pressure height $H_{pressure}$ shown on the pressure altimeter 13 and the outside temperature T indicated by the temperature probe 14 on the basis of the program instructions stored in the program memory 5. The program instructions for determining density height $H_{density}$ are based on the representation of density height as a function of temperature conventionally contained in operating instructions for the helicopter as a group of curves with pressure height as parameter. (The conventional diagram shows a group of curves with pressure height as parameter in the density height/temperature coordinate system). For determination of density height there are therefore stored in the program memory 5 on the basis of the known group of curves according to the Lagrange interpolation process certain approximation polynomials of the form $$H_{density} = A + B \cdot T + C \cdot T^2$$

with $A = K_0 \cdot H_{pressure} + K_1$
$B = K_2 \cdot H_{pressure} + K_3$
$C = K_4 \cdot H_{pressure} + K_5$ wherein $K_i$ *designates constants. On the basis of the so-determined density height $H_{density}$ the central processing unit 4 calculates the permissible maximum value $B_{max}$ of the blade angle according to the formula $$B_{max} = K_6 + K_7 \cdot H_{density}$$

(which is stored in program memory 5).
*$K_i = K_0 - K_5$

This formula (with the values of the constants $K_6$, $K_7$) may be derived from the helicopter operating instructions (blade angle and density height determine the load on the helicopter engine and of its gear unit. Helicopter operating instructions therefore state how large the blade angle may be at different density heights if the engine or the gear unit is not to be overloaded).

The central processing unit now calculates the quotients Q from the blade angle value $B_{meas}$ at a given time indicated by the blade angle indicator 1 and from the maximum value $B_{max}$ of the blade angle calculated from the density height $H_{density}$ at a given time:

$$Q = B_{meas}/B_{max}$$

The quotient Q and/or the values $B_{meas}$ and $B_{max}$ are displayed to the pilot on the display 22. (The display may appropriately have an analog display, for example in the form of a row of light emitting diodes, each of which is allocated a percentage value of the quotient Q). If the quotient Q is greater than 1 the central processing unit controls the audible signal generator 21 in relation to the quotient in such a way that a sound impulse sequence is generated up to a threshold value of 1.05 of the quotient, the pulse repetition frequency of which increases as the quotient increases and whereby a continuous audible signal is generated above the threshold value 1.05. The pulse repetition frequency of the audible impulse sequence is for example 5 cycles if the quotient is 1.01 and 15 cycles if the quotient is 1.05. Between the quotients 1.01 and 1.05 the frequency increases in linear progression from 5 to 15 cycles. The audible signal is passed to the pilot's headphones 23 from the sound transmitter 21 via the transceiver 20 so that the pilot is warned and is able to recognize the degree of overloading on the basis of the pulse repetition frequency and/or of the continuous signal. (The continuous audible signal generated when the threshold value is exceeded has the advantage that the pilot unmistakably perceives that a critical limit has been exceeded. It is, however, of course also possible to generate an audible impulse sequence having a correspondingly higher pulse repetition frequency above the threshold value). If the quotient is greater than 1.05 or remains within the 1.01 to 1.05 range for longer than 10 seconds, the central processing unit 4 stores in the control memory 7 the quotient Q or the quotient range or a corresponding code sign with the time at this given time shown on the clock 15 and/or the flying time resulting from the take-off time $T_{take-off}$ stored in memory 7 and with the duration of the excess in question.

During the flight the central processing unit 4 also periodically determines maximum permissible flight speed from density height and weight at a given moment by means of the program instructions stored in program memory 5. Weight $G_{mom}$ at a given moment is continuously calculated by the central processing unit by subtraction of fuel consumption (in units of weight) shown by the fuel consumption meter 12 from the take-off weight $W_{take-off}$. The program instructions for the maximum permissible flight speed are based on the representation of density height contained in the helicopter operating instructions as a function of flight speed as a group of curves with the weight at a given moment as parameter. (The conventional diagram shows a group of curves with weight at a given moment as a parameter in the density height/speed coordinate system). For determination of maximum flight speed $V_{max}$ there are therefore stored in program memory 5 on the basis of the known group of curves certain approximation polynomials, the form of which corresponds in principle to the approximation polynomials cited above in relation to the determination of density height and which is therefore not given in greater detail. (Maximum speed is determined from a third degree polynomial with density height as a variable, whereby the constants or coefficients are determined as a function of weight at a given moment).

The so-determined maximum permissible flight speed $V_{max}$ is displayed on the display 22. The effective flight speed is displayed to the helicopter pilot by the airspeed indicator (as measured by a Pitot or Prandtl tube) so that the pilot can adapt the flight speed according to the permissible maximum speed displayed on the display 22. The airspeed indicator of the helicopter could, of course, also be linked to the central processing unit 4, whereby the latter could indicate the effective flight speed together with the maximum speed on the display 22 and could trigger a flashing lamp as an optical warning signal when said maximum speed is exceeded.

When the helicopter lands, the switch 16 is closed and the central processing unit 4 stores in the memory 7 a code number designating the landing of the helicopter with the date and the landing time $T_{land}$ indicated on the clock 15. By means of a portable terminal 31 that can be connected to the interface 30 the contents of the control memory 7 may be read and deleted. The terminal 31 is not carried on board during the flight and is not made accessible to the pilot, so that the latter cannot delete the data on his exceeding the maximum permissible blade angle. The overload data readable via the terminal 31 provide for a check up on the pilot and are of importance for the maintenance staff. The stored take-off and landing times ensure reliable calculation of flight costs, particularly when the helicopter is rented out.

Program memory 5 also stores data processing instructions corresponding to the helicopter operating instructions to determine the maximum load. The maximum load is calculated from the amount of fuel present at take-off entered by the pilot on the keyboard 10, the weight of the persons carried and the largest density height to be attained during the flight. The latter may be calculated by the pilot on the basis of the height of the take-off site, the temperature at the take-off site, the air pressure and height distance to be overcome and entered using the keyboard 10. The largest density height may also be calculated by the central processing unit by means of appropriate program instructions on the basis of the pressure altimeter and temperature indicated by the pressure altimeter and temperature probe 13 and 14 as well as by the height difference to be overcome during the flight to be entered using the input keyboard. The central processing unit determines the maximum load according to the values entered using the keyboard 10 and displays these to the pilot on the display 22. In addition a load weighing device could be connected or could be capable of connection to the data bus 3 of the central processing unit 4 to enable the effective load to be displayed on the display 22.

A variant of the warning device (not shown) has a measuring device disposed at the lifting engine (aeroengine, jet engine) of a vertical take-off aircraft having a torque indicator and optionally a revolution counter for measurement of the torque and/or the output of the lifting engine. The measuring device is linked to a control device having a comparative or data processing unit which compares the value of the torque and/or output delivered by the measuring device with a maximum value for the torque and/or the output of the lifting engine on the basis of the operating instructions for the vertical take-off aircraft. As long as the value exceeds the maximum value, the control device controls an audible signal generator linked to the transceiver of the vertical take-off aircraft so that the latter emits a continuous or intermittent audible signal to the headphones of the transceiver for as long as the value is exceeded.

I claim:

1. A warning device in a rotary wing aircraft provided with a blade angle adjusting device for adjusting the blade angle of the rotor blades and a transceiver (20) with headphones (23), comprising an audible signal generator (21) connected to the transceiver (20), a measuring device (1, 13, 14) having a blade angle indicator (1) disposed on the blade angle adjusting device, a pressure altimeter (13) and an outside temperature probe (14), a control device (4-6) having a central processing unit (4) and a program memory (5) linked to the measuring device (1, 13, 14) containing a program memory (5) in which are stored data processing instructions for determining density height from pressure height and outside temperature, and data processing instructions corresponding to the predetermined operating thresholds of the aircraft to prevent overload, for determining the permissible maximum value of the blade angle from the determined density height, wherein said control device (4-6) determines the maximum permissible value of the blade angle for the density height determined according to the relevant pressure height and outside temperature, periodically calculates the quotient from the blade angle value and the maximum value, and in the case of the quotient exceeding the value 1, controls said audible signal generator (21) depending on the quotient in such a way that an audible impulse sequence is generated and emitted to the headphones (23), the pulse repetition frequency of which is greater, the greater the value of the quotient.

2. A warning device in a rotary wing aircraft provided with a blade angle adjusting device for adjusting the blade angle of the rotor blades and a transceiver (20) with headphones (23), comprising an audible signal generator (21) connected to the transceiver (20), a measuring device (1, 13, 14) having a blade angle indicator (1) disposed on the blade angle adjusting device, a pressure altimeter (13) and an outside temperature probe (14), a control device (4-6) having a central processing unit (4) and a program memory (5) linked to the measuring device (1, 13, 14) containing a program memory (5) in which are stored data processing instructions for determining density height from pressure height and outside temperature, and data processing instructions corresponding to the predetermined operating thresholds of the aircraft to prevent overload, for determining the permissible maximum value of the blade angle from the determined density height, wherein said control device (4-6) determines the maximum permissible value of the blade angle for the density height determined according to the relevant pressure height and outside temperature, periodically calculates the quotient from the blade angle value and the maximum value, and in the case of the quotient exceeding the value 1, controls said audible signal generator (21) depending on the quotient in such a way that an audible signal is generated and emitted to the headphones (23), the audible signal consisting of an impulse sequence up to a predetermined threshold value of the quotient, and above said threshold value consisting of a continuous audible signal.

3. A warning device in a rotary wing aircraft provided with a blade angle adjusting device for adjusting the blade angle of the rotor blades, comprising a warning signal generator (21), a measuring device (1, 13, 14) including a blade angle indicator (1) connected to the aircraft to provide a value of the angle of the blades of the aircraft, a pressure altimeter (13) and an outside temperature probe (14), a control device (4-6) having a central processing unit (4) and a program memory (5) linked to the measuring device (1, 13, 14) containing a program memory (5) in which are stored data processing instructions for determining density height from pressure height and outside temperature, and data processing instructions corresponding to the predetermined operating thresholds of the aircraft to prevent overload, for determining the permissible maximum value of the blade angle from the determined density height, the control device (4-6) operative for determining the maximum permissible value of the blade angle for the density height determined according to the relevant pressure height and outside temperature, comparing it with the blade angle value obtained from the blade angle indicator (1) and, for as long as the angle value from said blade angle indicator exceeds the maximum permissible value, operating said warning signal generator (21) to produce a warning signal, a control memory (7) connected to said control device, and said control device (4-6) further operative for periodically calculating the quotient from the blade angle value from said blade angle indicator (1) and the maximum value and storing every such quotient exceeding the value 1 by a specific amount for a specific time.

4. A warning device as set forth in claim 3, including a clock (15) connected to said control device (4-6), and said control device (4-6) operative to store every said such quotient exceeding the value 1 by a specific amount together with the appropriate time shown on said clock (15) in said control memory (7).

5. A warning device as set forth in claim 3, including a portable connecting unit (31) adapted to be coupled to said warning device and operative to read and to delete the contents of said control memory (7), whereby the contents of said control memory (7) can only be deleted by means of said connecting unit (31), and wherein said connecting unit is not to be carried on the aircraft so that the pilot cannot delete the contents of the control memory recording every such quotient exceeding the value 1 by a specific amount which can only be checked and deleted by an authorized person having said connecting unit.

6. A warning device in a rotary wing aircraft provided with a blade angle adjusting device for adjusting the blade angle of the rotor blades and a transceiver (20) with headphones (23), comprising an audible signal generator (21) connected to the transceiver (20), a measuring device (1, 13, 14) having a blade angle indicator (1) disposed on the blade angle adjusting device, a pressure altimeter (13), an outside temperature probe (14), a control device (4–6), an input device (10) connected to input to said control device (4–6) the amount of fuel and weight of aircraft personnel so said control device can calculate the take-off weight of the aircraft, a fuel consumption meter (12) and a display means (22) connected to said control device, said control device (4–6) having a central processing unit (4) and a program memory (5) linked to the measuring device (1, 13, 14) containing a program memory (5) in which are stored data processing instructions for determining density height from pressure height and outside temperature, and data processing instructions corresponding to the predetermined operating thresholds of the aircraft to prevent overload, for determining the permissible maximum value of the blade angle from the determined density height, and for determining the maximum permissible flight speed from the determined density height and weight at a given moment, wherein said control device (4–6) determines the maximum permissible value of the blade angle for the density height determined according to the relevant pressure height and outside temperature, compares the blade angle value obtained from the blade angle indicator (1) and the permissible maximum value of the blade angle and controls said audible signal generator (21) to emit a distinctive audible signal from said headphones (23) for as long as the comparison value exceeds the permissible maximum value, and said control device (4–6) determines the maximum permissible flight speed for the said density height and aircraft weight at a given moment, determined from the difference between the take-off weight and weight of fuel used determined from the fuel consumption meter (12), and displays the maximum permissible flight speed on said display means (22).

7. A warning device in a rotary wing aircraft provided with a blade angle adjusting device for adjusting the blade angle of the rotor blades and a transceiver (20) with headphones (23), comprising an audible signal generator (21) connected to the transceiver (20), a measuring device (1, 13, 14) having a blade angle indicator (1) disposed on the blade angle adjusting device, a pressure altimeter (13), an outside temperature probe (14), a control device (4–6), an input device (10) connected to input to said control device (4–6) the amount of fuel on take-off, weight of aircraft personnel, height and outside temperature and the height difference to be overcome during the flight, a display means (22), said control device (4–6) having a central processing unit (4) and a program memory (5) linked to the measuring device (1, 13, 14) containing a program memory (5) in which are stored data processing instructions for determining density height from pressure height and outside temperature, and data processing instructions corresponding to the predetermined operating thresholds of the aircraft to prevent overload, for determining the permissible maximum value of the blade angle from the determined density height, and for determining the maximum aircraft load on the basis of the values entered by said input device (10), wherein said control device (4–6) determines the maximum permissible value of the blade angle for the density height determined according to the relevant pressure height and outside temperature, compares the blade angle value obtained from the blade angle indicator (1) and the permissible maximum value of the blade angle, and controls said audible signal generator (21) to emit a distinctive audible signal from said headphones (23) for as long as the comparison value exceeds the permissible maximum value, and said control device (4–6) determines the maximum aircraft load according to the values entered by said input device (10), and displays the determined maximum load on said display means (22).

8. A warning device in a rotary wing aircraft provided with a blade angle adjusting device for adjusting the blade angle of the rotor blades, a landing gear and a transceiver (20) with headphones (23), comprising an audible signal generator (21) connected to the transceiver (20), a measuring device (1, 13, 14) having a blade angle indicator (1) disposed on the blade angle adjusting device, a pressure altimeter (13) and an outside temperature probe (14), a control device (4–6), clock means (15), switch means (16) disposed on the landing gear of the aircraft to be actuated on take-off and to be actuated on landing of the aircraft, said switch means (16) and clock means (15) connected to said control device, said control device (4–6) having a central processing unit (4) and a program memory (5) linked to the measuring device (1, 13, 14) containing a program memory (5) in which are stored data processing instructions for determining density height from pressure height and outside temperature, and data processing instructions corresponding to the predetermined operating thresholds of the aircraft to prevent overload, for determining the permissible maximum value of the blade angle from the determined density height, wherein said control device (4–6) determines the maximum permissible value of the blade angle for the density height determined according to the relevant pressure height and outside temperature, compares the blade angle value obtained from the blade angle indicator (1) and the permissible maximum value of the blade angle, and controls said audible signal generator (21) to emit a distinctive audible signal from said headphones (23) for as long as the comparison value exceeds the permissible maximum value, another memory (7) connected to said control device (4–6), and said control device (4–6) operative to store in said another memory (7) a code number at every actuation of said switch means (16) designating take-off or landing with the appropriate time shown on said clock means (15).

* * * * *